United States Patent Office 3,415,925
Patented Dec. 10, 1968

3,415,925
PROCESS FOR PREPARING PERMEABLE
POLYETHYLENE FILM
Nelson S. Marans, Silver Spring, Md., assignor to W. R. Grace & Co., New York, N.Y., a corporation of Connecticut
No Drawing. Continuation-in-part of application Ser. No. 314,612, Oct. 8, 1963. This application Aug. 1, 1967, Ser. No. 657,533
5 Claims. (Cl. 264—331)

ABSTRACT OF THE DISCLOSURE

This invention is directed to a process for preparing polyethylene film which is permeable to gas; said process comprises blending polyethylene with a minor amount of $C_{18}$ to $C_{40}$ paraffin, and subsequently pressing the blend to form a continuous film. The pressed film can be cooled to 15–50° C. and then heated at a temperature of at least 60° C. for a period of 1 to 60 minutes to further increase the gas permeability of said film, all as recited hereinafter.

---

This is a continuation-in-part of my copending application Ser. No. 314,612, filed Oct. 8, 1963, and now abandoned.

This invention is in the field of polyethylene films consisting essentially of polyethylene blended with a minor amount of $C_{18}$ to $C_{40}$ paraffin.

Canadian Patent 673,889 teaches the preparation of a composition comprising polyethylene and a mineral oil, said oil being essentially a mixture of saturated aliphatic hydrocarbons. U.S. Patent 2,920,349 teaches that polyethylene can be converted to fibrillatable film by rolling, and U.S. Patent 3,182,033 teaches that a polyethylene which has been blended with a petroleum wax of the paraffin type and crosslinked with a peroxide crosslinking agent can be pressed into sheets by means of a hydraulic press.

In summary, this invention is directed to a first process for preparing a film useable for packaging fresh fruits and vegetables, said process comprising: (a) forming a blend of polyethylene and a paraffinic hydrocarbon by blending together for a period of about 1–10 minutes at a temperature of about 25–200° C. about 85–99 parts by weight of polyethylene, said polyethylene; (i) having a melt index of about 0.1–15, said melt index being determined according to ASTM Designation D1238–62T using Condition E; (ii) having a molecular weight of about 10,000–150,000; (iii) having a density of about 0.91–0.96 gram per cubic centimeter; and (iv) being a solid within the temperature range of about 60–140° C. and about 1–15 parts by weight of a paraffinic hydrocarbon, said hydrocarbon having: (i) about 18–40 carbon atoms; and (ii) a density of about 0.80–0.96 gram per cubic centimeter; (b) forming a film of the aforesaid polyethylene and paraffinic hydrocarbon by pressing under a pressure in excess of about 10,000 pounds per square inch gauge pressure at a temperature of about 1–10° C. above the melting point of said blend; (c) releasing the pressure on the thus formed film and cooling said film below its melting point; and (d) recovering the thus formed film.

In preferred embodiments of the aforesaid first process:
(1) The film is formed by pressing the blend of polyethylene and paraffinic hydrocarbon at a pressure of about 15,000–35,000 pounds per square inch gauge pressure;
(2) The film is formed by pressing the blend of polyethylene and paraffinic hydrocarbon at a pressure of 25,000–30,000 pounds per square inch gauge pressure;
(3) The paraffinic hydrocarbon is a paraffinic oil having a viscosity of about 355–350 seconds, Universal Saybolt at 100° F. and the polyethylene is a polyethylene having a density of about 0.92 and a melt index of about 2, said melt index being determined by ASTM Designation D1238–62T, using Condition E;
(4) The paraffinic carbon is a paraffinic oil having a viscosity of about 355–350 seconds, Universal Saybolt at 100° F. and the polyethylene is a polyethylene having a density of about 0.96 and a melt index of about 5, said melt index being determined by ASTM Designation D1238–62T, using Condition E; and
(5) About 92–96 parts of the polyethylene are blended with about 4–8 parts of the paraffinic hydrocarbon.

In another preferred embodiment this invention is directed to a second process for preparing a film useable for packaging fresh fruits and vegetables, said process comprising: (a) forming a blend of polyethylene and a paraffinic hydrocarbon by blending together for a period of about 1–10 minutes at a temperature of about 25–200° C. about 85–99 parts by weight of polyethylene, said polyethylene; (i) having a melt index of about 0.1–15, said melt index being determined according to ASTM Designation D1238–62T, using Condition E; (ii) having a molecular weight of about 10,000–150,000; (iii) having a density of about 0.91–0.96 grams per cubic centimeter; and (iv) being a solid within the temperature range of about 60–140° C. and about 1–15 parts by weight of a paraffinic hydrocarbon, said hydrocarbon having; (i) about 18–40 carbon atoms; and (ii) a density of about 0.80–0.96 gram per cubic centimeter; (b) forming a film of said blend of polyethylene and paraffinic hydrocarbon by pressing under a pressure in excess of about 5,000 pounds per square inch gauge pressure at a temperature of about 1–10° C. above the melting point of said blend; (c) releasing the pressure on the thus formed film and cooling said film below its melting point; (d) adjusting the temperature of said film to about 15–50° C.; (e) heating said film to 60–110° C. for a period of about 1–60 minutes; and (f) recovering the thus treated film.

In preferred embodiments of the aforesaid second process:
(1) The film is heated to about 60–110° C. in a liquid medium after adjusting the temperature of the film to about 15–50° C.;
(2) The paraffinic hydrocarbon is a paraffinic oil having a viscosity of about 355–350 seconds, Universal Saybolt at 100° F. and the polyethylene is a polyethylene having a density of about 0.92 and a melt index of about 2, said melt index being determined by ASTM Designation D1238–62T, using Condition E;
(3) The paraffinic hydrocarbon is a paraffinic oil having a viscosity of about 355–350 seconds, Universal Saybolt at 100° F. and the polyethylene is a polyethylene having a density of about 0.96 and a melt index of about 5, said melt index being determined by ASTM Designation D1238–62T, using Condition E; and
(4) About 92–96 parts of the polyethylene are blended with about 4–8 parts of the paraffinic hydrocarbon.

The present invention relates to the preparation of useful polyethylene films, and more specifically to a method for preparing polyethylene films which possess a superior degree of gas permeability.

Polyethylene film has proven to be valuable packaging material. The inertness and vapor imperviousness of polyethylene makes it an ideal wrapping material for countless articles which require a high degree of protection against moisture. However, for certain packaging uses polyethylene has been found to be far from satisfactory. The very properties of polyethylene which render it valuable as a moisture barrier render it unsuitable for applications which require the transference of certain amounts of gaseous products.

For example, the metabolism of fresh fruits and vegetables require that they exude and ingest certain amounts of oxygen and carbon dioxide. Polyethylene which is all but impervious to gas has been found unsuitable for wrapping fresh foods and vegetables unless it is first punctured by a plurality of holes to permit the transference of gaseous materials. Such punching permits the passage of insects and microorganisms and, hence, has not proven satisfactory as a method for improving the permeability of polyethylene wrapping material.

It is an object of the present invention to provide an improved method for increasing the gas permeability of polyethylene film, thereby to provide a packaging material which is a substantially barrier to bugs, insects, fungi, microorganisms, and the like but permeable to gases including air, $O_2$, and $CO_2$. Thus, the instant invention fills a long-felt need by providing a solution to a problem which has long vexed the food packaging industry.

Broadly, the present invention contemplates a process for enhancing the gas permeability of polyethylene film which comprises blending polyethylene with a minor amount of a $C_{18}$ to $C_{40}$ paraffin, and subsequently pressing the blended film under minimum pressure of 10,000 p.s.i. (pounds per square inch gauge pressure) at a temperature above the melting point of the polyethylene (e.g., 1–5° C. or 2–3° C. above said melting point) to obtain a continuous film of desired thickness. In a slightly different embodiment of this invention the pressing step may take place at a lower pressure, said lower pressure being at least about 5,000 lbs. per square inch; the pressed film is cooled to about 15–50° C. and then heated, preferably in a liquid medium, to a temperature of at least 60° C.

More specifically, I have made the surprising discovery that the gas permeability of a polyethylene film of a given thickness and type can be substantially increased by either of the two related processes which are presented below.

PROCESS I

The steps of this process comprise:
(1) Blending a solid polyethylene polymer with from about 1 to about 15% by weight of paraffin having 18 to 40 carbon atoms.
(2) Pressing the polyethylene-paraffin blend into a film using pressures in excess of about 10,000–35,000 p.s.i.g. (pounds per square inch gauge pressure) at a temperature above the melting point of the polyethylene to obtain a polyethylene film of a desired thickness.
(3) Cooling the pressed film to obtain a self-sustaining film structure.
(4) Recovering the thus formed film.

PROCESS II

The steps of this process comprise:
(1) Blending from about 1 to about 15% by weight of $C_{18}$ to $C_{40}$ paraffin with polyethylene as set forth in Process I, supra.
(2) Pressing the polyethylene-paraffin blend at pressures in the range of about 5,000–35,000 p.s.i.g. at temperatures above the melting point of the blend to obtain a film of a desired thickness.
(3) Cooling the thus formed film to about 15–50° C.
(4) Subjecting the cooled film to a heating bath maintained at a minimum temperature of 60° C. for a period sufficient to uniformly heat the film to a temperature of at least 60° C.
(5) Recovering the thus treated film.

As can be seen by comparing the above-outlined processes, Process I varies from Process II only in that higher pressing pressures are used in Process I, and Process II utilizes a cooling step which is followed by a heating step. While it has been found that Process I will produce a substantial increase in permeability, it has been found that Process II, which includes the cooling step and the heat step, produces the maximum amount of permeability increase for a given polyethylene composition.

Any polyethylene which is a solid at room temperature (e.g., 25–30° C.) and which has a molecular weight of about 10,000–150,000 can be used in the practice of Process I of the present invention. Any polyethylene which is a solid within the temperature range of about 60–140° C. and which has a molecular weight of about 10,000–150,000 can be used in Process II of said invention. Thus, the polyethylene used in a formation of the present novel permeable film can be either of the high or low density type. Preferred polyethylenes possess a density from about 0.91 to about 0.96 gram per cubic centimeter. These polyethylenes may be further characterized by possessing a melt index in the range of from about 0.1 to about 15, the melt index being determined by Condition E of ASTM Designation D1238–62T.

Paraffinic hydrocarbons (paraffins) used in the practice of the present invention are well known to those skilled in the art and consist of saturated straight and branched chain hydrocarbons having from about 18 to about 40 carbon atoms. These paraffins are also characterized by possessing a density of from about 0.80 to about 0.96. Paraffin oils having a viscosity range of from about 50 to about 100 cps. at 25° C. are particularly suitable. Higher viscosity and lower viscosity oils may be used but the above material has the advantage of being commercially available in good purity.

I have found that a minimum amount of paraffin in the range of about 1 percent blended with the polyethylene polymer will result in a substantial increase in permeability when the blend is processed in accordance with the teachings of the instant invention. However, excellent results have been obtained with as much as about 15 percent by weight of paraffin. For normal use, it is generally preferred to incorporate from about 4 to about 8 percent by weight paraffin into compositions which will be processed according to the process of the instant invention. This range provides a film having desirable mechanical qualities, as well as superior permeability characteristics.

The paraffin is blended with the polyethylene at temperatures either above or below the melting point of the polyethylene used. Generally, these temperatures range from about 25 to about 200° C. Preferably, strong mechanical mixing action is used during the blending. The device used is dependent on whether the mixing is accomplished in the solid or molten phase. Such devices including ribbon blenders, Henschel mixers, Waring Blendors, Brabender Plastographs, and the like are well known to those skilled in the art.

Using the above blending temperatures, it is found that adequate blending of the paraffin with the polyethylene will be achieved in from about 1 to about 10 minutes.

Subsequent to blending with the paraffin, the blend is pressed under conditions of heat and pressure which correspond to the embodiment of the invention being practiced. Therefore, in Process I outlined above, the pressing step will take place at pressures in excess of 10,000 pounds per square inch gauge pressure. The maximum pressure used in Process I is strictly dependent on the mechanical limitations of the pressing devices used. The pressing step takes place at temperatures slightly (ca. 1–10° C., preferably 3–5° C.) in excess of the melting point of the particular polyethylene used. Typical presses used to achieve the pressing operation comprise platen type presses in which pressures in excess of 25,000 pounds per square inch can be obtained and conventional roller extrusion devices which product similar pressures can be used on a continuous basis.

On the other hand, when the process outlined as Process II above is used, lower pressing pressures can be used to obtain the desired excellent results. Thus, generally speaking, pressures of about 5,000 p.s.i.g. are sufficient to obtain a continuous film product have been found to be sufficient in Process II. However, if a maximum degree of permeability increase is desired, pressing pressures ranging up to the maximum mechanical limit permitted by the apparatus used can be employed. Therefore, pressures ranging up as high as 25,000 to 30,000 pounds per square inch or higher can be used in accordance with Process I and Process II. However, Process II, wherein a cooling step followed by a heating step are essential parts of the process, does not need a pressing pressure in excess of that required to obtain a continuous film (e.g., ca. 5,000 p.s.i.g.). An air bath (e.g., air at room temperature) or a water bath using cool (e.g., 15–20° C.) water have given excellent results where used to cool film in the cooling step of Process II. Other cooling means will, on the basis of my disclosure, be readily apparent to those skilled in the art.

Using the pressing pressure set forth above, it has been found that conventional presses will easily provide films in the order of about 0.2 to about 10 mils thick (a mil is 0.001 inch). Such films have been found to possess substantially greater permeability than untreated films of the same general type.

In accordance with the embodiments set forth in Process II, subsequent to preparing a film of a desired thickness, the film is cooled to about 15–50° C., preferably about 20–35° C., and then subjected to heating, preferably in an inert liquid heating media such as water. The cooling and heating sequence does not serve to remove any substantial amount of paraffin oil from the film, but in some way such sequential treatment causes sufficient disunity of the polymeric film to increase the gas permeability thereof. Cooling times of about 1–30 minutes, preferably 3–10 minutes are sufficient to bring the film to the desired temperature which must be about 50° C. or lower. Heating temperatures in the range of about 60–120° C. can be used. At these temperatures, from about 1 to about 60 minutes, preferably 3–15 minutes, of heating are required to obtain thorough and uniform heating—the exact heating period depending on film thickness.

The films obtained by the present method possess varying degrees of vapor permeability depending on the type of polyethylene initially used and the amount of paraffin incorporated therein. Furthermore, the degree of pressing, i.e., amount of pressure used, and whether or not the above-mentioned cooling and heating sequence is used, govern the amount of permeability increase. Generally speaking, it is found that low density polyethylene treated in accordance with the present invention, will possess a higher degree of vapor permeability than those of higher density. The present films are particularly useful for packaging food articles because the same nontoxic characteristics inherently possessed by the original polyethylene film will be retained in the paraffin-polyethylene film blend.

Films prepared by either Process I or Process II of my invention from low density polyethylene have a substantially greater permeability to gas than do films prepared by said processes from high density polyethylene. (See Tables I and II.) However, it has been found that films made from high density polyethylene are stronger (less subject to being punctured, torn, or ruptured where used to package fruits, vegetables, and other foodstuff) than are films made from low density polyethylene. Thus, by virtue of their greater strength films of high density polyethylene suitable for packaging fruit, vegetables, and the like can be much thinner than film of low density polyethylene, thereby to compensate for the greater permeability of the low density films.

In the ensuing specific examples permeability measurements are obtained by the Zwick permeability apparatus. Essentially, the apparatus consists of a pressure reservoir holding 47 cc. of $O_2$ on one side of the film specimen. The micrometered film is held between gaskets on a sintered metal disk and the reservoir is pressured to 5 to 10 atmospheres. The gas volume forced through the film is measured manometrically. Appropriate conversions are then made to give the final value in cc. of $O_2$ passing through a 1 mil thick film of 1 square meter in area per day under a pressure of 1 atmosphere.

Having described the basic aspects of the present invention, the following detailed specific examples are given to illustrate embodiments thereof.

Example I

A series of polyethylene-paraffin oil blends were prepared containing varying percentages of paraffin oil. A high density polyethylene identified as Grex having a melt index of 5 and a density of 0.96 gram per cubic centimeter and a low density polyethylene identified as Alathon 14 having a melt index of 2 and a density of 0.92 gram per cubic centimeter were used. The blends were prepared using through 20-mesh (U.S. Standard) polyethylene and U.S.P. paraffin oil, viscosity about 355–350 seconds, Universal Saybolt at 100° F. The oil was admixed using strong mechanical mixing action. The blended samples were then pressed in a plate press using pressures in the order of 15,000 pounds per square inch and temperatures slightly in excess of the melting point of the blend. The pressing resulted in the formation of continuous films having thicknesses ranging from 7 to 8 mils. As outlined in Table I, some of the films were cooled to about 25° C. and, subsequent to such cooling, subjected to treatment in a water bath at temperatures ranging from 60–110° C. (An autoclave was used to obtain 110° C.) One sample of each blend was not subjected to the cooling-heating sequence, and one sample in each group which contained no paraffin oil served as a control. The permeability of these films, as well as nontreated (control or oil free) samples of similar films, were determined using the procedure previously set forth in the specification. The results of permeability increase using this procedure are set forth in the table below:

TABLE I

| Polymer | Paraffin oil, percent by weight | Water, T., °C. | Permeability, cc. mil/atm. $M^2$ day x $10^{-3}$ | Percentage increase |
|---|---|---|---|---|
| Alathon 14 | 0 | None | 8.42 | |
|  | 3.85 | ¹ 60 | 10.44 | 24 |
|  |  | ¹ 70 | 10.45 | 24 |
|  |  | ¹ 80 | 10.51 | 25 |
|  |  | ¹ 90 | 9.49 | 15 |
|  |  | None | 9.58 | 16 |
| Alathon 14 | 0 | None | 8.42 | |
|  | 1.96 | ¹ 80 | 9.56 | 14 |
|  |  | None | 9.25 | 10 |
|  | 3.85 | ¹ 80 | 10.61 | 26 |
|  |  | None | 9.58 | 14 |
|  | 7.41 | ¹ 80 | 12.3 | 46 |
|  |  | None | 11.93 | 42 |
| Grex | 0 | None | 1.49 | |
|  | 3.85 | None | 1.96 | 32 |
|  |  | ¹ 70 | 2.24 | 50 |
|  |  | ¹ 80 | 2.19 | 47 |
|  |  | ¹ 90 | 2.19 | 47 |
|  |  | ¹ 100 | 2.13 | 45 |
|  |  | ² 110 | 2.56 | 72 |
|  | 0.99 | None | 1.50 | 1 |
|  |  | ¹ 90 | 1.71 | 15 |
|  | 13.36 | None | 2.96 | 98 |
|  |  | ¹ 80 | 3.64 | 144 |

¹ This film was cooled to 20–25° C. before heating.
² This film was cooled to 20–25° C. before heating. An autoclve wasa used to reach 110° C.

Example II

A series of polyethylene-paraffin oil blends were prepared containing varying amounts of paraffin oil. The blends were prepared by vigourously admixing for 10 minutes. Two polyethylenes were used, one was identified as Grex having a melt index of 5.0 and a density of 0.96. The other polyethylene was identified as Alathon 14 having a melt index of 2.0 and a density of 0.92.

The following blends of polyethylene and paraffin oil were prepared for use in this example.

(1) Grex—100 parts; no additive.
(2) Grex—96.2 parts; U.S.P. paraffin oil, heavy, white domestic, viscosity 335–350 seconds, Universal Saybolt at 100° F., 3.8 parts.
(3) Grex—95.4 parts, paraffin wax, melting point 65–70° C., 4.6 parts.
(4) Alathon 14—100 parts; no additive.
(5) Alathon 14—95.6 parts; U.S.P. paraffin oil, as above, 4.4 parts.
(6) Alathon 14—95.9 parts; paraffin wax, as above, 4.1 parts.

Blended samples were then pressed at 6,000 pounds per square inch at a temperature of 155° C. for the Grex blends and at 6,000 p.s.i. at 125° C. for the Alathon 14 blends. Films having a thickness of 2 mils were obtained.

The above films were then subjected to the following treatments:

(a) No treatment.
(b) Extraction with hexane at room temperature (ca. 20–25° C).
(c) Cooled to 30–35° C. and then placed in a water bath being maintained at about 80° C.

The permeabilities of these films were determined by the procedure used in Example I, supra. The results obtained are presented in Table II which also includes results obtained with two controls (blend (1), treatment (a), and blend (4), treatment (a)).

TABLE II

| Blend | Treatment | Additive, Percent | Removal of material by treatment, Percent | Permeability, cc. mil/atm. M² day x 10⁻³ | Percentage increase in permeability |
|---|---|---|---|---|---|
| 1* | a | 0.0 | 0.0 | 1.48 | |
| 1 | b | 0.0 | 0.33±0.02 | 1.40 | −5 |
| 1 | c | 0.0 | 0.00 | 1.78 | +20 |
| 2 | a | 3.78 | 0.0 | 1.58 | +6 |
| 2 | b | 3.78 | 3.85±0.03 | 1.62 | +9 |
| 2 | c | 3.78 | 0.05 | 2.31 | +49 |
| 3 | b | 4.56 | 1.89±0.14 | 1.60 | +9 |
| 3 | c | 4.56 | 0.03 | 1.90 | +28 |
| 4* | a | 0.0 | 0.0 | 8.64 | |
| 4 | b | 0.00 | 0.59±0.03 | 8.69 | +1 |
| 4 | c | 0.00 | 0.00 | 9.17 | +6 |
| 5 | a | 4.37 | 0.0 | 8.73 | +1 |
| 5 | b | 4.37 | 4.89±0.07 | 8.49 | −2 |
| 5 | c | 4.37 | 0.0 | 11.17 | +29 |
| 6 | b | 4.09 | 2.49±0.16 | 8.10 | −6 |
| 6 | c | 4.09 | 0.0 | 9.17 | +6 |

*Control.

From the above table, it is noted that although substantially all the added paraffin oil was removed by the hexane extraction (or treatment), there was no significant change in the oxygen peremeability. This lack of change indicates that the leaching of the wax or oil leaves no permanent pores in the polyethylene film. The positions previously occupied by the oil or wax apparently collapse at the moment of hexane treatment. Furthermore, it is clearly seen that the water treatment significantly increases the permeability of the film without removing the paraffin oil or wax.

The above specific examples clearly indicates that substantial increases in vapor permeability of polyethylene film may be obtained by the teaching of the present invention.

The term "continuous film" as used in the present specification describes a film which is substantially non-perforated and nonfragmented. As indicated on page 1 of the specification, prior workers have increased the permeability of polyethylene films by inserting a plurality of perforations therein. Such a film is not considered to be substantially continuous. Furthermore, "continuous" indicates that when the film is formed from individual particles, the particles are substantially fully coalesced into each other, and do not appear in the form of partially connected fragments.

As used herein, the term "high density" polyethylene means polyethylene having a density of about 0.94–0.96 gram per cubic centimeter and the term "low density" polyethylene means polyethylene having a density of about 0.91 gram per cubic centimeter and higher but lower than about 0.94 gram per cubic centimeter.

The term "parts" as used herein means parts by weight unless otherwise defined where used.

The term "percent" as used herein means parts per hundred by weight unless otherwise defined where used, except that the term "percentage increase in permeability" refers to a percentage increase in the volume of gas passed through permeable film.

I claim:

1. A process for preparing a film useable for packaging fresh fruits and vegetables, said process comprising:
   (a) forming a blend of polyethylene and a paraffinic hydrocarbon by blending together for about 1–10 minutes at a temperature of about 25–100° C. about 85–99 parts by weight of polyethylene, said polyethylene; (i) having a melt index of about 0.1–15, said melt index being determined according to ASTM Designation D1238–62T, using Condition E; (ii) having a molecular weight of about 10,000–150,000; (iii) having a density of about 0.91–0.96 gram per cubic centimeter; and (iv) being a solid within the temperature range of about 60–140° C. and about 1–15 parts by weight of a paraffinic hydrocarbon, said hydrocarbon having; (i) about 18–40 carbon atoms; and (ii) a density of about 0.80–0.96 gram per cubic centimeter;
   (b) forming a film of said blend of polyethylene and paraffinic hydrocarbon by pressing under a pressure in excess of about 5,000 pounds per square gauge pressure at a temperature about 1–10° C. above the melting point of said blend;
   (c) releasing the pressure on the thus formed film and cooling said film below its melting point;
   (d) adjusting the temperature of said film to about 15–50° C.;
   (e) heating said film to 60–110° C. for a period of about 1–60 minutes; and
   (f) recovering the thus treated film.

2. The process of claim 1 in which the film is heated to about 60–110° C. in a liquid medium after adjusting the temperature of the film to about 15–50° C.

3. The process of claim 1 in which the paraffinic oil has a viscosity of about 355–350 seconds, Universal Saybolt at 100° F. and the polyethylene is a polyethylene having a density of about 0.92 and a melt index of about 2, said melt index being determined by ASTM Designation D1238–62T, using Condition E.

4. The process of claim 1 in which the paraffinic hydrocarbon is a paraffinic oil having a viscosity of about 355–350 seconds, Universal Saybolt at 100° F. and the polyethylene is a polyethylene having a density of about 0.96 and a melt index of about 5, said melt index being determined by ASTM Designation D1238–62T, using Condition E.

5. The process of claim 1 in which about 92–96 parts of the polyethylene are blended with about 4–8 parts of the paraffinic hydrocarbon.

References Cited

UNITED STATES PATENTS

| | | | |
|---|---|---|---|
| 2,157,049 | 5/1939 | Bartoe et al. | 264—346 |
| 2,219,684 | 10/1940 | Fawcett et al. | 260—28.5 |
| 2,920,349 | 1/1960 | White | 264—175 |
| 3,182,033 | 5/1965 | Gregorlan | 260—28.5 |

ROBERT F. WHITE, *Primary Examiner.*

G. AUVILLE, *Assistant Examiner.*

U.S. Cl. X.R.

264—234